June 5, 1928.　　　　　　　　　　　　　　　　　　　1,671,970
G. W. CARPENTER
LIQUID RECTIFIER
Filed June 7, 1921
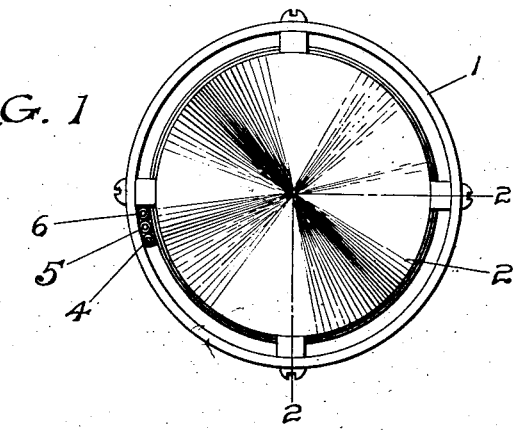
FIG. 1
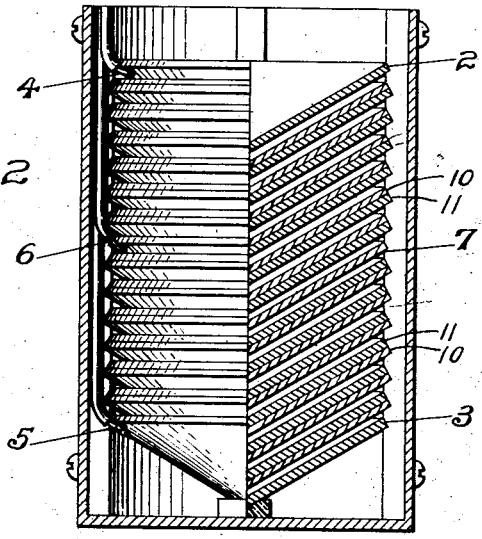
FIG. 2
FIG. 3
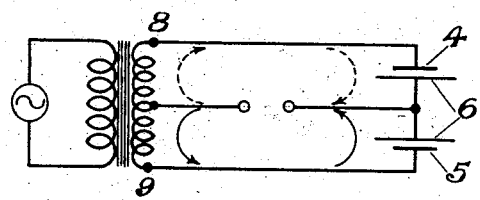
Inventor
Glenn W. Carpenter
By　E. W. Chapman
Attorney Patented June 5, 1928.

1,671,970

UNITED STATES PATENT OFFICE.

GLENN W. CARPENTER, OF PALO ALTO, CALIFORNIA.

LIQUID RECTIFIER.

Application filed June 7, 1921. Serial No. 475,840.

My invention relates to liquid rectifiers and an object thereof is to provide a rectifier of this character which may be the source of high voltage direct current supply for vacuum tube transmitters. The rectifier described hereinafter is suitable for use in high or low power vacuum tube transmitters, or for any other purpose where it is desirable to obtain a high voltage direct current from an alternating current source. The rectifier will also be especially useful in vacuum tube transmitters used for radio telephony.

I will now describe in detail one form of my rectifier, it being understood that many changes and modifications may be made in the apparatus without departing from the spirit of my invention as defined in the appended claims.

In the drawings:

Fig. 1 is a plan view of the rectifier.

Fig. 2 is partly an elevation and partly a vertical sectional view taken on the line 2—2 of Fig. 1; and Fig. 3 is a diagrammatic view illustrating the operation of the rectifier.

With reference to Figures 1 and 2 numeral 1 indicates any suitable container in which the various elements of the rectifier are mounted.

The rectifier consists of a series of cone shaped plates, the alternate plates being of aluminium and lead, carbon, or other conducting material. The top and bottom cones in the container, indicated by numerals 2 and 3 respectively, are of lead, carbon, or other suitable material and serve as two positive primary electrodes or anodes of the rectifier, the terminals being referred to by numerals 4 and 5. The center cone 7 is made of aluminium and serves as a negative primary electrode or cathode of the rectifier, there being but a single negative terminal 6. Between the primary positive and negative electrodes are a plurality of intermediate electrodes, each intermediate electrode in the upper half of the rectifier, between the terminals 4 and 6, consisting of an aluminium and a lead cone 10 and 11 riveted or welded together, with the aluminium cone 10 uppermost. It will readily occur to those versed in the art that such a rigid joining together of the cones, effects a direct electrical connection between the same, hence eliminating the need for external leads between cells in order to obtain a series relation thereof. The reduction of such leads results in a more rugged, dependable and efficient piece of apparatus. In the lower half of the rectifier, between the terminals 5 and 6, the intermediate electrodes are composed of one aluminium and one lead cone 10 and 11 formed in the same manner as those described above, except that in this case, the lead cones 11 are uppermost. The completed intermediate electrodes are separated and are held apart by suitably constructed insulated uprights. Since the conical shape of the electrodes serves the double function of increasing the active surface or electrical capacity of the plates and also as a suitable receptacle for the electrolyte, the spaces between the elements may be filled with some solution such as ammonium bi-phosphate, whereby the lead cone of one intermediate electrode and the aluminium cone of another intermediate electrode are electrically connected through the electrolyte.

In its simplest form my liquid rectifier would consist of a single cell containing an aluminium plate and a plate of some other conducting material such as lead or carbon, and immersed in some solution such as ammonium bi-phosphate. For the purpose of explaining the internal action of the rectifier I will so consider it.

If such a cell is placed in an electric circuit with the potential drop across the cell of such a polarity that a current will pass through the cell in the direction of aluminium to lead a well known electrolytic action gradually builds up an insulating film of hydroxide of aluminium on the aluminium plate. The current in the circuit will gradually decrease as the film becomes thicker, until the current is reduced to zero. For potentials in the opposite direction, the resistance of the cell is very low.

A cell so formed therefore will act as a rectifier of alternating currents, passing that half of the cycle which sends current in the direction of lead plate or anode, to the coated aluminium plate or cathode, and stopping current on the half cycle of opposite potential. A single or two plate cell can be made to withstand approximately 300 volts without danger of breakdown; and obviously for a very high voltage rectifier any desired number of cells may be placed in series.

The simple diagram of Figure 3 illustrates the operation of the rectifier of Figures 1 and 2 in rectifying both halves of the cycle of an alternating current. The outside terminals 8 and 9 of the high voltage winding of the step-up transformer are connected to the lead cone terminals 4 and 5 of the rectifier, and the center tap of the high voltage winding is connected through the direct current lead to the aluminium cone terminal 6 of the rectifier.

As explained above, current flows only from lead to aluminum through the electrolyte, that is, the direction of current flow is always toward the center tap of the rectifier, through the load and to the center of the transformer. The solid line arrows in Fig. 3 indicate the direction of current flow when terminal 9 of the transformer is positive and the broken line arrows indicate the direction of current flow when terminal 8 of the transformer is positive.

It will be understood that special filtering circuits for smoothing out the wave form of the current, may or may not be employed, as the particular conditions warrant. As filtering circuits are well known they need not be described herein, but reference is made to my application Ser. No. 439,585, filed January 24, 1921, showing my liquid rectifier combined with filtering circuits for smoothing out the ripples before impressing the current on the plates of the oscillating tubes. It has been found possible to reduce the ripple to 1% by the use of filter circuits, which is sufficient for the use of the transmitter for radio telephony.

When very high power vacuum tube transmitters are employed, filter systems capable of handling the total output of the rectifier might prove expensive. To eliminate the filter systems, polyphase alternating currents may be used with a number of the rectifier units hereinbefore described. Of course, the greater the number of phases, the more constant is the direct current; and while three phases would be very desirable a six phase system would require very little more equipment.

If desired, filter circuits may be combined with the polyphase alternating current system to further assist in smoothing out the wave form, but obviously the filter circuit will be greatly reduced, as the initial ripple will not be large.

Having fully described my invention, what I claim as new and desire to secure by Letters Patent, is:

1. A liquid rectifier comprising a series of spaced cone-shaped electrodes, said electrodes being assembled in independent sections comprising an anode and a cathode the surfaces of which are arranged in abutting relation, and an electrolyte in the spaces separating said sections.

2. A liquid rectifier having two spaced positive terminals and an intermediate negative terminal, independently spaced anodes and cathodes the surfaces of which are arranged in abutting relation between said terminals, and an electrolyte filling said spaces, the anodes and cathodes on each side of said intermediate terminal being arranged in polarity to rectify opposite halves of an alternating current cycle.

3. In a liquid rectifier comprising a plurality of cells, each of the latter consisting of an anode and cathode separated by an electrolyte, the arrangement being characterized by the fact that the cathode of one cell is contiguous with the anode of an adjoining cell.

4. A liquid rectifier comprising a series of spaced plate electrodes including a plurality of primary electrodes and a plurality of intermediate electrodes each of said intermediate electrodes consisting of a plurality of independent sections two sections of which comprise an anode and a cathode the surfaces of which are in direct physical and electrical contact with their adjacent sections, and an electrolyte in the spaces separating said spaced plate electrodes.

5. A liquid rectifier comprising a series of spaced concave electrodes including a plurality of primary electrodes and a plurality of intermediate electrodes each of said intermediate electrodes consisting of a plurality of independent concave sections, two sections of which comprise an anode and a cathode, the surfaces of which are in direct physical and electrical contact with their adjacent sections, and an electrolyte within the spaces separating said concave electrodes.

6. A liquid rectifier comprising a series of spaced conical electrodes including a plurality of primary electrodes and a plurality of intermediate electrodes, each of said intermediate electrodes consisting of a plurality of independent conical sections, two sections of which comprise an anode and a cathode, the surfaces of which are in direct physical and electrical contact with their adjacent sections, and an electrolyte within the spaces separating said conical electrodes.

7. A liquid rectifier comprising a series of spaced conical electrodes, including a plurality of primary electrodes and a plurality of intermediate electrodes, each of said intermediate electrodes consisting of a plurality of independent conical sections of different metals, two sections of which are in direct physical and electrical contact with their adjacent sections, and an electrolyte within the spaces separating said electrodes.

8. A liquid rectifier comprising a series of spaced plate electrodes, including a plurality of primary electrodes and a plurality of intermediate electrodes, each of said intermediate electrodes consisting of two sections one of lead and the other of aluminum, the surfaces of which are in direct physical and electrical contact with each other, and an electrolyte within the spaces separating said electrodes.

GLENN W. CARPENTER.